(12) United States Patent
Yuan et al.

(10) Patent No.: US 7,366,141 B2
(45) Date of Patent: Apr. 29, 2008

(54) CELL SEARCH METHOD AND APPARATUS IN A WCDMA SYSTEM

(75) Inventors: Jiehui (Allen) Yuan, Victoria (AU); Olga Tcherviakova, Victoria (AU); Dobrica Vasic, Victoria (AU); Angus James MacKinnon, Victoria (AU); David Stanhope, Victoria (AU)

(73) Assignee: NEC Corporation, Tokyo (JP)

( * ) Notice: Subject to any disclaimer, the term of this patent is extended or adjusted under 35 U.S.C. 154(b) by 849 days.

(21) Appl. No.: 10/762,341

(22) Filed: Jan. 23, 2004

(65) Prior Publication Data
US 2004/0174849 A1   Sep. 9, 2004

(30) Foreign Application Priority Data
Jan. 23, 2003  (AU) ............... 2003900300
Oct. 30, 2003  (AU) ............... 2003259590

(51) Int. Cl.
*H04B 7/216* (2006.01)
*H04B 1/00* (2006.01)
*H04Q 7/28* (2006.01)

(52) U.S. Cl. ............ 370/335; 370/341; 370/342; 375/145

(58) Field of Classification Search ........... 341/61, 341/89, 143; 370/335, 341, 342; 375/145
See application file for complete search history.

(56) References Cited

U.S. PATENT DOCUMENTS

| | | | | |
|---|---|---|---|---|
| 5,953,366 A | * | 9/1999 | Naruse et al. ........... 375/148 |
| 6,487,193 B1 | * | 11/2002 | Hamada et al. .......... 370/342 |
| 6,891,883 B2 | * | 5/2005 | Sourour et al. .......... 375/148 |
| 7,046,754 B2 | * | 5/2006 | Demir et al. ............ 375/360 |
| 7,126,981 B2 | * | 10/2006 | Ho et al. ................ 375/147 |
| 7,194,011 B1 | * | 3/2007 | Nassiri-Toussi et al. ... 370/503 |
| 2003/0021367 A1 | * | 1/2003 | Smith ..................... 375/346 |
| 2003/0185283 A1 | * | 10/2003 | Ho et al. ................ 375/147 |
| 2003/0193922 A1 | * | 10/2003 | Ho et al. ................ 370/342 |

FOREIGN PATENT DOCUMENTS

| WO | WO 00/21201 | 4/2000 |
|---|---|---|
| WO | WO 02/29994 | 4/2002 |

OTHER PUBLICATIONS

Ho et al., "Cell Search for 3GPP W-CDMA/FDD with Chip Clock Shift and Non-ideal Sampling", 2001 IEEE (No date available); pp. 2369-2373.*

* cited by examiner

*Primary Examiner*—William Trost
*Assistant Examiner*—Marivelisse Santiago-Cordero
(74) *Attorney, Agent, or Firm*—Young & Thompson

(57) ABSTRACT

A cell search method for use in a mobile communication system, the method including: performing one or more identification steps for identifying timing and codes of oversampled input signals; and reducing the resolution of the oversampled input signals before performing the one or more identification steps.

23 Claims, 6 Drawing Sheets

TYPICAL CIRCUIT OF ONE THE THREE CELL SEARCH STAGES

CELL SEARCH METHOD AND APPARATUS IN A WCDMA SYSTEM

BACKGROUND OF THE INVENTION

1. Field of the Invention

This invention relates to a method and apparatus for implementing a cell search in a mobile wireless communication system. More specifically, the invention relates to a reduced circuit and power cell search method and circuit in a W-CDMA (Wide-band CDMA) system.

2. Description of the Related Arts

Wireless communication systems, adopting a CDMA (Code Division Multiple Access) cellular schema as a technique for multiple mobile terminals access, due to terminal movement and propagation condition changes, require continuous searching for new cells on the UE (User Equipment) side for initial synchronization establishment (scrambling code/frame timing identification) with the transmitting cell.

One of the standards, supporting a CDMA system has been offered by a consortium named "$3^{rd}$ Generation Partnership Project" (3GPP) and stated in a set of documents including Document Nos. 3G TS 25.211, 3G TS 25.212, 3G TS 25.213 and 3G TS 25.214 (the W-CDMA standard). Those documents are incorporated herein by reference. According to this standard, a following procedure for cell search is applied in a WCDMA system, consisting of three steps: STEP 1 for slot timing identification, STEP 2 for frame timing and code group identification, and STEP 3 for scrambling code identification.

FIG. 1 is a block diagram which illustrates a typical example of the structure of a prior art cell search circuit 7, accommodated in a conventional mobile terminal. The cell search circuit 7 applicable for any of the cell search stages (STEPs), includes a correlating unit 702 or matched filter 704 (which is implementation-dependent) for despreading of the base-band received signal on each STEP of the cell search procedure.

In spread spectrum communication, despreading indicates spread demodulation in a receiver side using the same spread code as that of a transmission side. A matched filter generally comprises a plurality of registers and multipliers for multiplying the output of each stage register by a coefficient and an adder for adding the outputs of the plurality of multipliers and outputting the sum. A correlating unit 702 with a bank of correlators performs the actual despreading by correlation between the codes generated by the code generator 703 and the base-band received signal.

Despreading in STEP 2 (frame timing and code group identification) and STEP 3 (scrambling code identification) is typically performed by correlating unit 702, though the matched filter 704 could also be used. Code generator 703 generates a required code for correlation with base-band received signal—SSCH code for frame timing and code group identification on STEP 2, a primary scrambling code for identification on STEP 3 and PSCH code for STEP 1 despreading when a correlating unit is used for slot timing detection. All codes are defined by 3GPP standard [3G TS 25.211-25.215].

A power calculation unit 705, to which the output of correlating unit 702 or matched filter 704 is an input, obtains a power of correlated signal based on I (in-phase) and Q (quadrature) components of incoming signal.

An accumulator 706, to which the output of power calculation unit 705 and a memory unit 707 are the inputs, performs the accumulation for current power results and the previous results stored in memory for the predetermined period of time. The accumulator 706 performs averaging in time to increase reliability of detection.

A memory unit 707 to which the output of accumulator 706 is the input, is used to save the intermediate power results. A detector unit 708 searches for a maximum value among the accumulated results in memory 707 for a peak candidate. A decision unit 709, compares a detected maximum against the calculated average value of the accumulated profile stored in memory 707 with regard to a predetermined threshold coefficient.

A control unit 701, which receives a system counter signal, controls the operation timing of each of the circuit components.

With the specified cell search method, to improve the detection the input to cell search unit (the received baseband signal) is usually over-sampled. Increased sampling rate of the incoming signal translates to finer time resolution and hence generally leads to better output in terms of accuracy. However, in some conditions it may cause losses in performance. To monitor cells on the other FDD frequencies (inter-frequency search) and on other radio access technologies supported by UE, a compressed mode [3G TS 25.212, 25.215] is adopted, when the search is not continuous and is performed in time slots or gaps specified by transmission gap pattern. Typical cell search procedure may require more than a single gap processing for each STEP in order to achieve reliable performance.

In conditions of high frequency offset low density of gaps results in significant timing drift between the processing intervals, causing drift of the peak location within single STEP processing as well as between the STEPs. It results in uncertainty and errors in exact detection as the true peak becomes spread over a few positions, a so called "blurring effect", which becomes even more dramatic in an over-sampled data stream. At the same time, as different STEPs can not be usually processed in the same gap, due to timing drift the real peak position at the start of the STEP is shifted from the reference timing, provided by the previous processing, which leads to additional errors in detection. The effect may be even more severe if the drift is big enough, so that the next STEP simply loses the peak.

Therefore it is desirable to provide a cell search method and apparatus with an increase of cell search performance in compressed mode with low density of gaps in high frequency offset conditions.

Moreover, over-sampling of incoming base-band signals results in larger hardware size in both functional circuit scale and memory size. A consequent shortcoming with the conventional cell search circuit of larger hardware size, is the increase of electric current consumed, which is critical to a mobile station's performance. In this regard, it is desirable to optimize power consumption of the UE in order to maximize the portability and operation time of the device.

In light of the foregoing, it is desirable to provide an improved method and apparatus for acquiring UE synchronization with a transmitting base station under critical conditions. It is also desirable to provide an improved cell search method and circuit through which the scale of the circuitry and power consumption are reduced.

SUMMARY OF THE INVENTION

According to one aspect of the invention there is provided a cell search method for use in a mobile communication system, the method comprising the steps of:

performing one or more identification steps for identifying timing and codes of oversampled input signals; and reducing the resolution of the oversampled input signals before performing the one or more identification steps.

Preferably, the step of reducing the resolution of the oversampled input signals includes at least one of sample-combining and down-sampling the oversampled input signals.

The one or more identification steps may produce an output in the form of reference timing output signals, and the method may further include converting the reference timing output signals back to an un-reduced resolution when each identification step is complete.

Preferably, the method further includes, in each identification step, correlating the reduced resolution input signal with a code, calculating the power of the correlated signal, accumulating the power results, storing the accumulated power results and searching for a maximum accumulated power result.

The method may also include comparing the maximum accumulated power result with a threshold, and when the threshold is exceeded, converting the reference timing output signal back to an un-reduced resolution.

The one or more identification steps may include one or more of
a slot timing identification step;
frame timing and code group identification step,
a scrambling code identification step.

According to another aspect of the invention there is provided an apparatus for implementing a cell search in a mobile communication system, comprising:
identification means for identifying timing and codes from oversampled input signals; and
resolution reduction means for reducing the resolution of the oversampled input signals.

Preferably, the apparatus also includes conversion means for converting reference timing output signals from the identification means back to the original resolution of the oversampled input signals and the identification means includes:
a slot timing identifier;
a frame timing code and group number identifier, and
a scrambling code identifier.

The resolution reduction means may include at least one of a sample-combiner and down-sampler for operation with each of the identifiers which may be operable at a different sub-sampling rate for each identifier. Further, each resolution reduction means may include at least one of a sample-combiner and down-sampler.

Each identifier may also include a matching or correlating unit for despreading the oversampled input signals, a code generator, a power profile creator and a detector. The matching or correlating unit may include a matched filter or a bank of correlators. The power profile creator may include a power calculator for obtaining the power of a correlated signal, an accumulator for accumulating current power results and previous result and a memory for storing the accumulated power results.

The detector may by arranged to search for a maximum value among the accumulated power results and may include a decision unit for comparing the detected maximum against a threshold and, when the threshold is exceeded, the detector is arranged to convert the reference timing output signal back to an un-reduced resolution.

Typically, in a CDMA receiver the identification of timing and codes includes the following steps:
identifying slot timing;
identifying frame timing and code group; and
identifying a scrambling code.

In the method of the present invention, one or more of these steps, and preferably all of these steps are performed on compressed data streams produced by the step of reducing the resolution of oversampled input signals. The identification steps are preferably performed sequentially in the following order:
STEP 1: slot timing identification, (e.g. based on maximum values in power profile accumulated over a plurality of slots);
STEP 2: frame timing and code group number identification, (e.g. for at least one of the candidates from STEP 1); and
STEP 3: scrambling code identification, (e.g. for at least one of the candidates from STEP 2).

The resolution reduction of the oversampled input signals is preferably performed by at least one sample-combiner and down-sampler. Where the identification means includes a slot timing identifier, a frame timing code and group number identifier, and a scrambling code identifier, the apparatus may include a respective sample-combiner and down-sampler for each identifier. Alternatively, a single sample-combiner and down-sampler may have different sub-sampling rates, one for each identifier.

Each identifier preferably includes a matching or correlating unit, a code generator, a power profile creator and a detector. The matching or correlating unit despreads the band-based input signals using the same spread code as that of the transmission signal. This unit may comprise a matched filter or a bank of correlators. The power profile creator may include a power calculator which obtains a power of the correlated signal, an accumulator for accumulating current power results and previous results and a memory for storing the accumulated power results. The detector is preferably arranged to search for a maximum value among the accumulated results in memory and may include a decision unit for comparing the detected maximum against a threshold. When the threshold is exceeded, a reference timing is produced which is converted back to the original resolution and the cell search process proceeds to the next step.

Thus, in the present invention a "coarse-to-fine" resolution approach is adopted, in which the identification steps are run on coarse compressed resolution data streams. Reference timing, detected and/or updated within each step is provided to the next stage of processing after conversion back to the original resolution.

This conversion of the reference timing ensures accuracy in the start of the next step processing. Compression, performed by the sample-combiner together with the down-sampler, simply transforms the original data signal into different space, while avoiding information losses. Therefore, the total "coarse-to-fine" resolution approach enhances detection in high frequency drift conditions as a "sample" in a coarse resolution becomes a compressed interpretation of a few original samples, thus less affected by "blurring". This also leads to significant hardware reduction, required by UE.

The set of hypotheses searched on STEP 2 and STEP 3 is typically referred as a search window. The search window implies a number of "samples" in adopted resolution around the timing reported from the previous step. In accordance with this aspect, the invention can also minimize the error of uncertainty, arising from the introduced resolution reduction because the reduction applied on one of the steps is fully recovered on the next one due to defined search window and/or data compression applied. The invention also results in possible reduction of the processed search window without any loss in performance, as the actual number of processed samples from a resynchronized window is decreased due to transformation to coarse resolution, performed by sample-combiner and down-sampler. Moreover, it also improves the performance as the same hardware resources can be used for processing wider search windows, which is specifically essential for high frequency drift conditions.

Still other objects and advantages of the invention will become readily apparent to those skilled in this art from the following detailed description, wherein only the preferred embodiment is shown and described to illustrate the invention. As will be realized, the invention is capable of other and different embodiments and its several details are capable of modifications in various obvious respects, all without departing from the invention. Accordingly, the drawings and description are to be regarded as illustrative in nature, and not as restrictive.

DETAILED DESCRIPTION OF THE INVENTION

Figure 1:
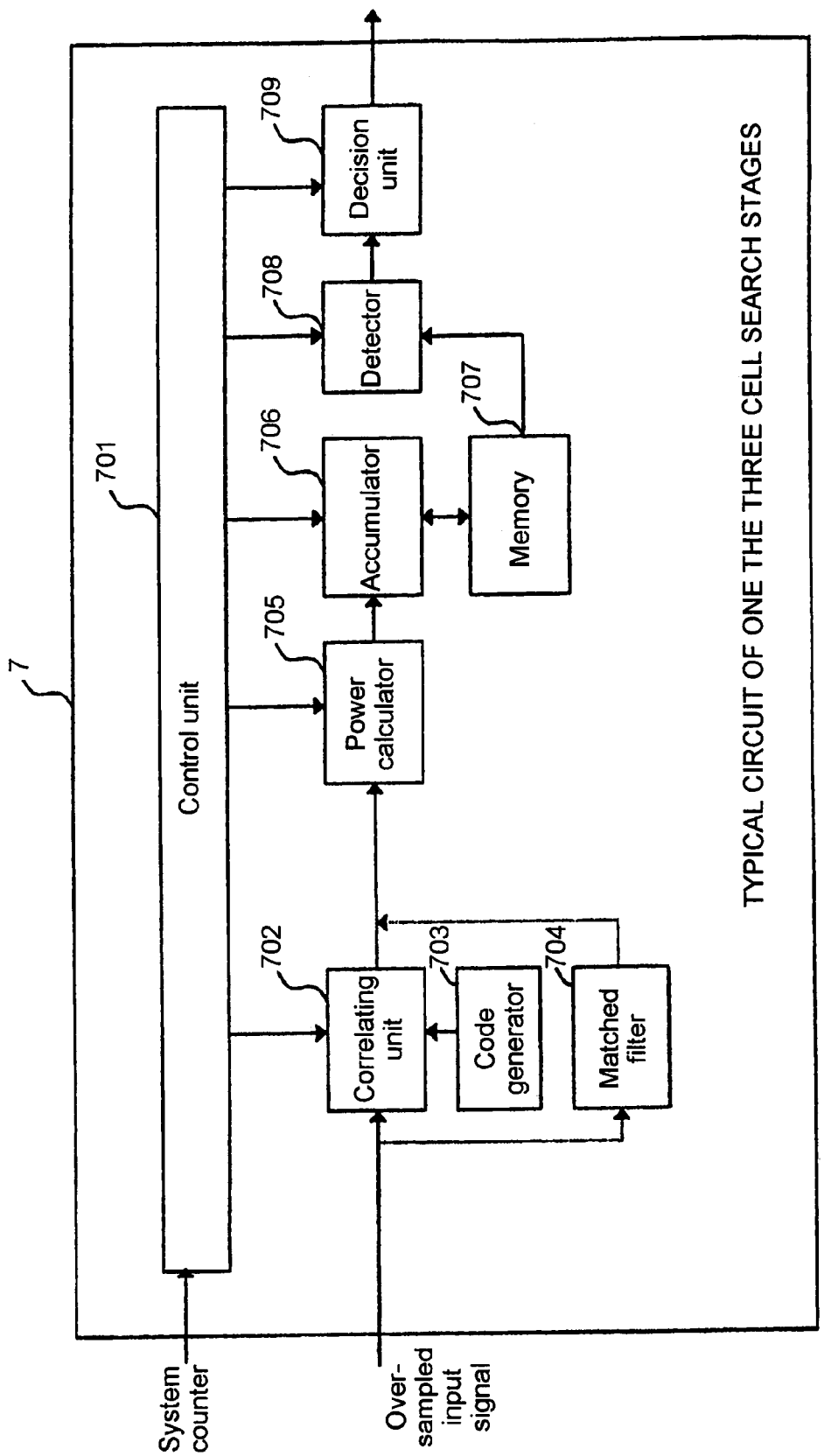
FIG. 1 is a block diagram illustrating the structure of a single stage of cell search circuit according to the prior art.
Figure 2:
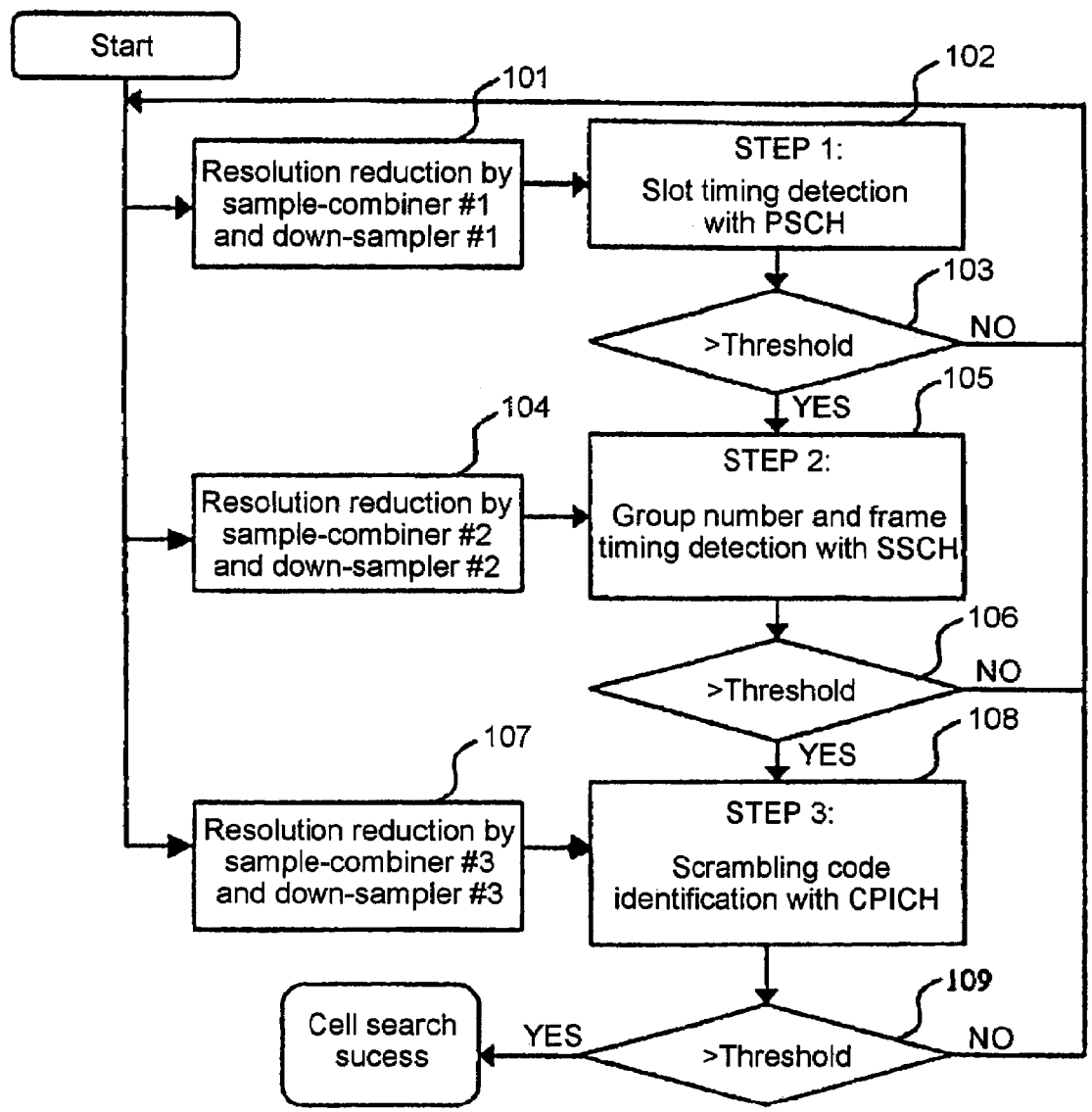
FIG. 2 is a flowchart describing steps performed in a cell search method according to an embodiment of the present invention.

A preferred method in accordance with the invention will now be described with particular reference to FIG. 2. Standard cell search procedure proposed by 3GPP consortium [3G TS 25.211-25.215] for WCDMA communication systems includes a STEP 1 (slot timing identification), a STEP 2 (frame timing and code group number identification) and a STEP 3 (scrambling code identification), whose circuits can be illustrated by the generic structure presented in FIG. 1 and discussed in more detail below. The invention has the following features with regard to these steps of the proposed cell search method as shown in FIG. 2.

Over-sampled input data base-band stream incoming into STEP 1 is reduced in resolution by a first sample-combiner and down-sampler in step 101. Slot timing identification is thus performed on this coarse resolution in step 102, providing one or more candidate course slot timings for STEP 2 to a decision unit which performs a threshold validation in compressed resolution space in step 103. Candidate(s), selected by decision unit is (are) provided for further identification to STEP 2. The correct starting point of further processing is ensured by conversion of the candidates' reference timings back to original resolution space by a reference timing conversion unit at the end of STEP 1.

Over-sampled input base-band data stream incoming into STEP 2 is reduced, in step 104, in resolution by a second sample-combiner and down-sampler with regard to a typical search window around the candidate timing usually applied on STEP 2 for better resynchronization. Frame timing and code group number identification is thus performed in step 105 on this coarse resolution for one or more of candidates obtained from STEP 1 with further validation of the result by decision unit, operating on a threshold basis in step 106. Candidate(s), selected by decision unit is (are) provided for further identification to STEP 3. The correct starting point of further processing is ensured by conversion of the candidates' reference timings back to original resolution space by reference timing conversion unit at the end of STEP 2.

Over-sampled input base-band data stream incoming in to STEP 3 is reduced, in step 107, in resolution by a third sample-combiner and down-sampler with regard to a typical search window around the candidate timing usually applied on STEP 3 for better resynchronization. Scrambling code identification is thus performed in step 108 on this coarse resolution for one or more of the candidate(s) obtained from STEP 2 with further validation of the result by decision unit, operating on a threshold basis in step 109. Candidate(s), selected by decision unit is(are) transferred outside the cell search block for further processing, which correct starting point is ensured by conversion of the candidates' reference timings back to original resolution space by reference timing conversion unit at the end of STEP 3.

By using the cell search algorithm having the features above, three steps of cell search procedure are performed in coarse or coarse and original data resolution, whereunder coarse resolution compressed space of the original over-sampled base-band input signal is considered.

The invention allows the reduction of required hardware resources, such as memory storage, number of correlators and shifts in matched filters.

The invention also enables the overall performance of the system to be increased in terms of better detection in high frequency drift conditions due to compression of the information, contained in several samples in original resolution in a single coarse resolution sample. Applying typical cell search procedures to the coarse resolution signal in compressed mode search with low gap density patterns results in better detection which is more robust to timing drift, caused by high frequency offset, as the "blurring" effect is reduced by coarse resolution, while at the same time, the search window of the same size in new resolution becomes equivalent to widen the actual window in original data space due to sample-combining.

Total uncertainty error of the cell search, introduced by resolution reduction, may be equal to half the "sample" of the resolution, used on the last stage of processing, as the error introduced by down-sampling on any of the previous steps is fully recovered on the next stage of processing.

Figure 3:
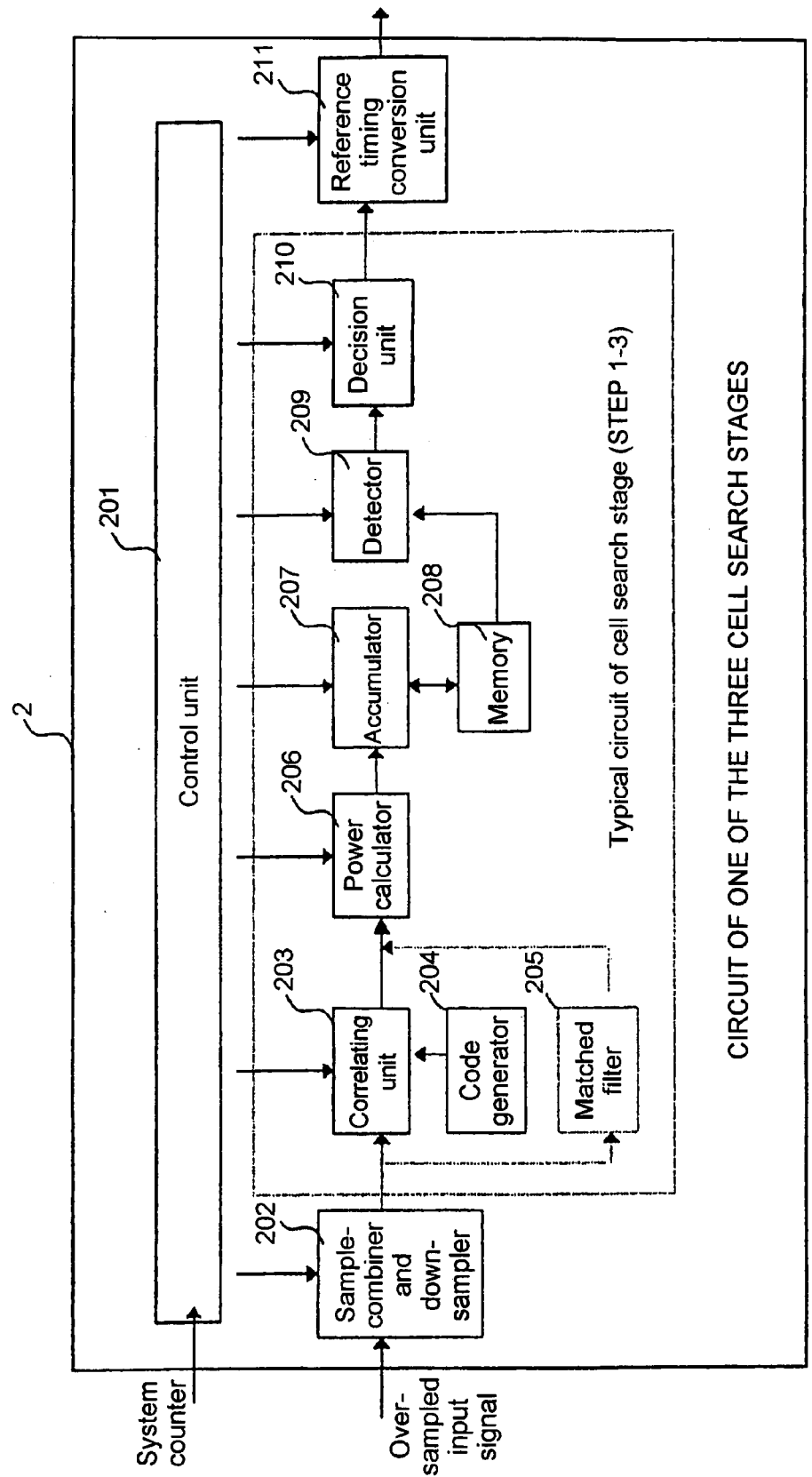
FIG. 3 is a block diagram illustrating the structure of a single stage of cell search circuit according to an embodiment of the present invention.

Preferred embodiments of apparatus in accordance with the invention will now be described in detail with particular reference to FIGS. 3 to 7 of the accompanying drawings. FIG. 3 shows a cell search circuit 2, illustrating the structure of a typical cell search step according to the present invention. It includes a sample-combiner and down-sampler unit 202 for resolution reduction of the received signal in more detail as described with reference to FIGS. 4A to 4D, a correlating unit 203 with accompanying code generator 204, a power calculating unit 206, an accumulator 207 for profile calculation, a memory 208 for intermediate results storage, a detecting unit 209 for maximum search, a decision unit 210 for validation of the calculated results against a specified threshold, a reference timing conversion unit 211 and a control unit 201. Depending on implementation, a matched filter 205 can be used instead of a correlating unit and code generator to provide the same functionality. Units 203 to 210 represent a typical circuit of the single STEP of cell search, shown in FIG. 1 and described in more detail in Background of the Invention.

Figure 4A:
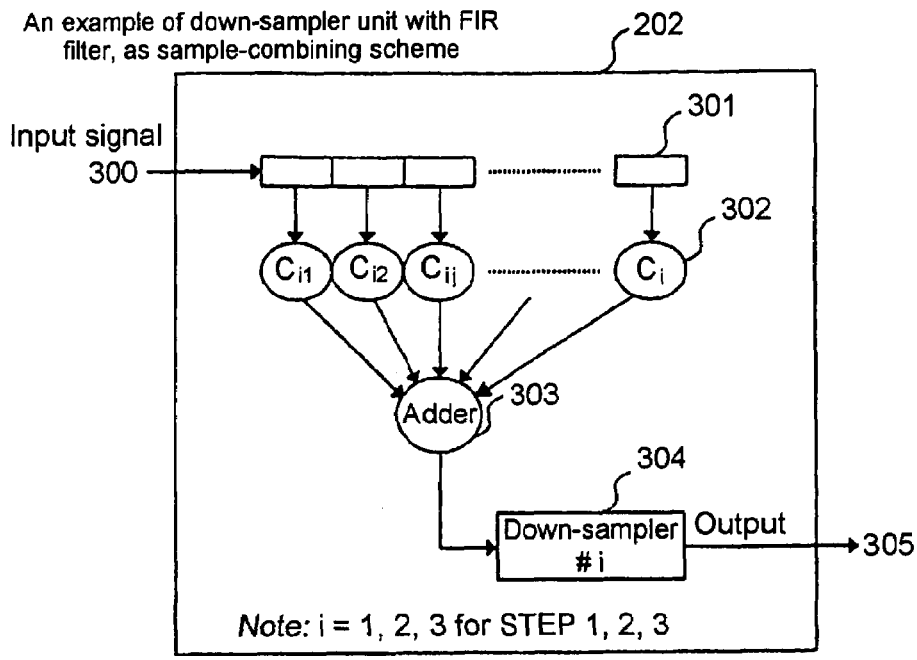
FIGS. 4A to 4D illustrate a resolution reduction unit and resolution reduction schemes for resolution reduction/compression of the received signal prior to main cell search processing.
Figure 4B:
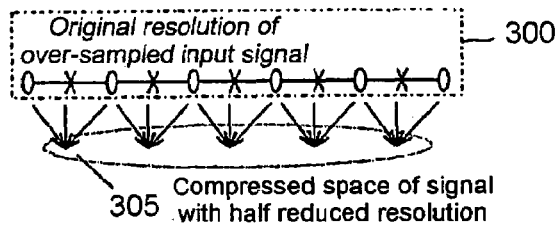
Figure 4D:
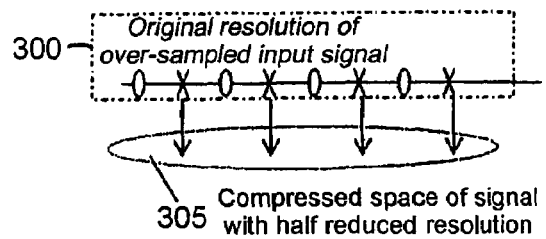
Figure 4C:
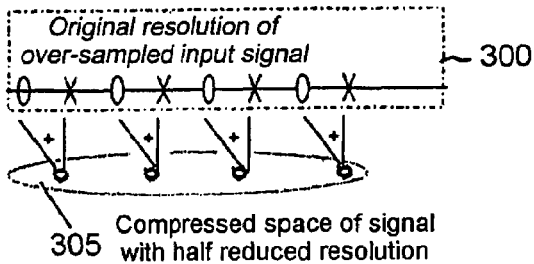

The term sample-combiner as used herein is to be understood to represent a unit, performing functions of FIR (Finite Impulse Response) filtering, any other filtering or sample accumulation. FIGS. 4A to 4D contain some examples of schemes that can be used in sample-combiner and down-sampler units referred as 202 on FIG. 3. A sampler-combiner receives over-sampled base-band signals in original resolution as an input 300 and transfers a converted data stream as an output to an adder 303 and down-sampler #i 304, where i=1, 2, 3. The down-sampler may have a plurality of sub-sampling rates, e.g. a sub-sampling rate 1, rate 2, rate 3 for STEP 1, STEP 2, STEP 3 respectively. The output of sample-combiner and down-sampler is therefore resolution reduced, FIG. 4A illustrates sampler-combining on the base of a FIR filter, consisting of a plurality of shift registers 301, using N coefficients 302 of $C_{i1}, C_{i2}, \ldots, C_{ij}, \ldots, C_{iN}$, where i=1, 2, 3, for STEPs 1, 2, 3 and an adder 303. FIGS. 4B to 4D show some other different schemes that can be used for resolution reduction: simple sample accumulation combined with down-sampling (FIGS. 4B and 4C) or simple sample decimation (FIG. 4D).

FIG. 4B shows a sample-combiner scheme with accumulation of three consecutive samples and down-sampling every second output. The original resolution of the over-sampled input signal 300 is reduced into a compressed space output 305 with half reduced resolution. FIG. 4C shows a sample-combiner scheme with two sample accumulation and down-sampling of every second output. Again, the original resolution of the over-sampled input signal 300 is reduced into a compressed space output 305 with half reduced resolution. FIG. 4D illustrates a simple decimation scheme in which the original resolution of the over-sampled input signal 300 is also reduced into a compressed space output 305 with half reduced resolution.

The operation of the cell search circuit 2 of the present invention will now be described in greater detail with particular reference to FIGS. 5 to 7.

Figure 5:
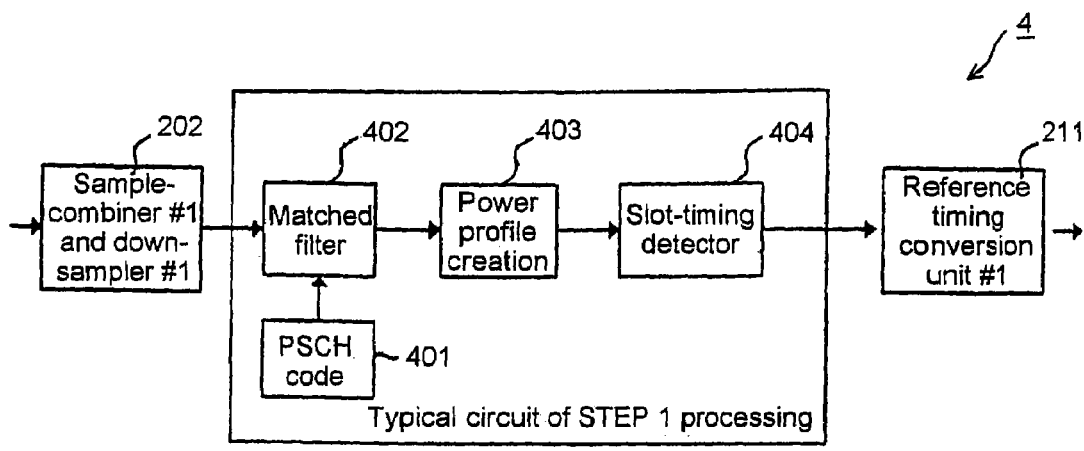
FIG. 5 is a block diagram of a first stage of cell search circuitry.

FIG. 5 illustrates the search method applied on STEP 1 in accordance with the present invention, and also illustrates a circuitry 4 used in the cell search of STEP 1. When the STEP 1 starts, the incoming over-sampled base-band signal is reduced in resolution by the sample-combiner #1 and down-sampler #1 202 prior to main cell search processing. Building of a correlation power profile 403 begins through the output of matched filter 402 de-spreading with PSCH code 401. The processing above is executed successively over the duration of one slot. When first profile is complete, it is stored in memory 208 for further accumulation, which is performed with the each of new profiles available by the accumulator 207. The accumulation process lasts for the predefined time interval. After accumulation is complete, slot timing detector 404 performs the search for one or more maximum value(s) over the above profile for timing candidate(s) for further identification. Decision unit 210 of the detector 404 will validate the peak value by applying a threshold in regard to calculated average value of the accumulated profile. Peaks, approved by decision unit 210 represent the candidate slot timings for further frame and code group identification and their reference timing is transferred to STEP 2 after being converted in reference timing conversion unit 211 from coarse resolution, used on STEP 1, to original data rate. This ensures minimum error in the start of the next stage and ends the processing of STEP 1.

Figure 6:
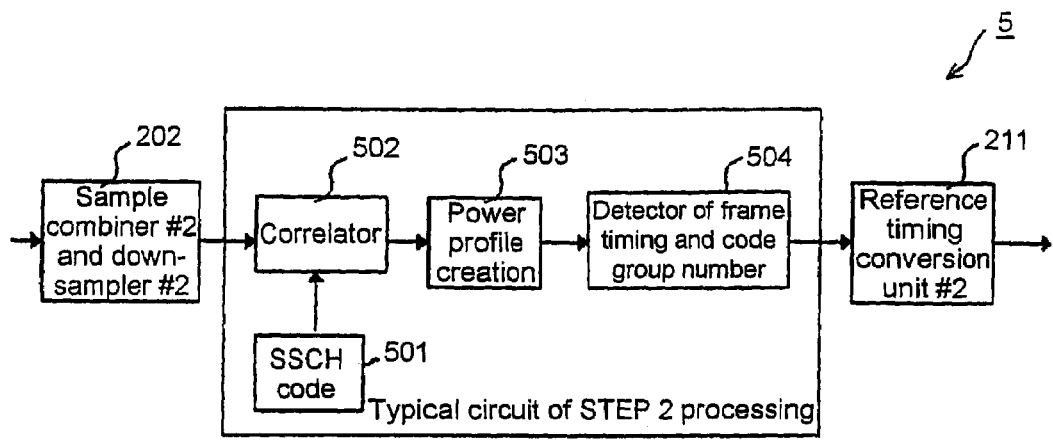
FIG. 6 is a block diagram of a second stage of cell search circuitry.

FIG. 6 illustrates the search method applied on STEP 2 in accordance with the present invention, and also illustrates a circuitry 5 used in the cell search of STEP 2. STEP 2 starts with regard to the search window around the peak candidate from STEP 1, the incoming over-sampled base-band signal is reduced in resolution by sample-combiner #2 and down-sampler #2 202 prior to main cell search processing. The correlating unit 502 performs correlation of an input signal reduced in resolution with SSCH codes supplied by code generator 501, and a power profile 503 is created by the correlation, and accumulation unit 503 using memory using an a storage of intermediate results. The accumulation process lasts for the predefined time interval. After accumulation is complete and processed according to typical STEP 2 procedure, detector 504 performs the search for one or more maximum value(s) over the above profile for best candidate(s) for further identification. Decision unit 210 of the detector 504 will validate this peak value by applying a threshold in regard to calculated profile. Peaks, approved by the decision unit represent the best candidates based on frame/slot timing and code group for further scrambling code identification and their timing is transferred as a reference to next stage of cell search (STEP 3) after being converted in reference timing conversion unit 211 from coarse resolution, used on STEP 2, to original data rate. This ensures minimum error in the start of the next stage and ends the processing of STEP 2.

Figure 7:
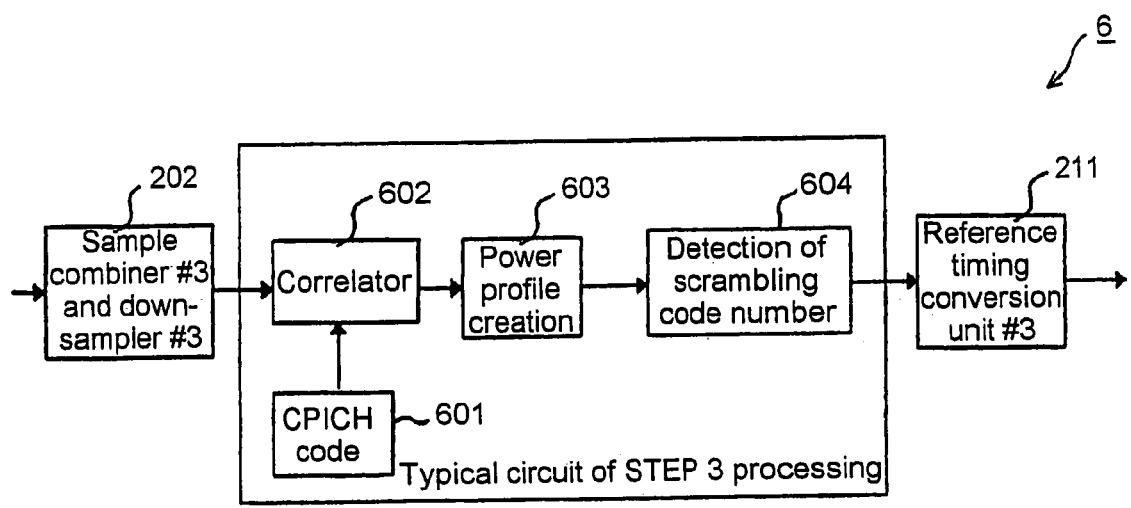
FIG. 7 is a block diagram of a third stage of cell search circuitry.

FIG. 7 illustrates the search method applied on the last step of specified cell search procedure, i.e. STEP 3 in accordance with the present invention, and also illustrates a circuitry 6 for performing STEP 3. STEP 3 starts with regard to the search window around the best candidate from STEP 2, the incoming over-sampled base-band signal is reduced in resolution by sample-combiner #3 and down-sampler #3 prior to main cell search processing. The profile 603 is created by the correlating unit 602 performing correlation of input signal reduced in resolution with primary scrambling codes supplied by code generator 601, and an accumulation unit using memory for storage of intermediate results. The accumulation process lasts for the predefined time interval. After accumulation is complete detector 604 performs the search for one or more maximum value(s) over the above profile for best candidate(s) for further identification. Decision unit 210 of the detector 604 will validate this peak value by applying a threshold in regard to average of calculated profile. Peaks, approved by the decision unit 604 represent the best candidates, and from the index of peak(s) scrambling code can be obtained with regard to the code group number, provided by STEP 2. Therefore, the identification, consisting of frame and slot timing and scrambling code group is complete and an updated output based on last results reference timing can be provided for further processing outside the cell search block. Prior to this transferal of the results, reference timing is by the reference timing conversion unit 211 converted from coarse resolution, used during STEP 3 processing, to original data rate. This ensures minimum error in the start of the next stage and ends the processing of STEP 3.

As shown by FIGS. 5 to 7, for each of the three steps in cell search, three different associated sample-combiners and down-samplers may be applied, namely sample-combiner #1 and down-sampler #1—for STEP 1, sample-combiner #2 and down-sampler #2—for STEP 2, and sample-combiner #3 and down-sampler #3 for STEP 3. As the configuration of sampler-combiner Units and sub-sampling rate can be different between the different steps, this means that all three cell search stages can be processed in independent data resolution if required. This is also guaranteed by the fact that the reference timing, updated on the results of the detection on each of the steps, is converted to original resolution after the main processing is complete prior to being a reference for the next stage identification.

Figure 8:
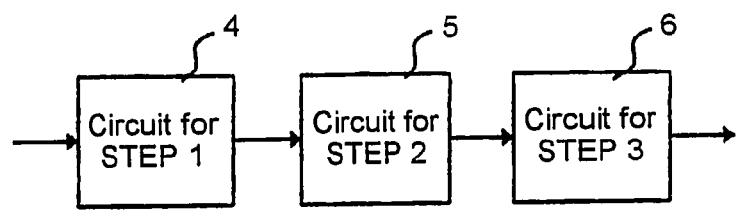
FIG. 8 is a block diagram of a cell search circuit including the first to third staged illustrated in FIGS. 5 to 7.

FIG. 8 illustrates an example of a cell search circuit which performs STEP 1, STEP 2 and STEP 3 in sequence This cell search circuit is constructed by connecting circuitries 4 to 6 illustrated in FIGS. 5 to 7, respectively, in series.

The present invention therefore provides an improved method and apparatus for implementing a cell search in a CDMA mobile communication system which has several advantages including a reduction in the scale of circuitry and in power consumption without any significant loss in performance.

It will be appreciated that various modifications, alterations and additions may be made to the preferred embodiments described above without departing from the scope and spirit of the invention.

What is claimed is:

1. A cell search method for use in a mobile communication system, the method comprising the steps of:
   performing one or more identification steps for identifying timing and codes of oversampled input signals;
   reducing resolution of the oversampled input signals before performing the one or more identification steps,
   wherein the step of reducing resolution of the oversampled input signals includes sample-combining and down-sampling the oversampled input signals; and
   wherein the one or more identification steps each produce an output in a form of reference timing output signals, the method further comprising the step of converting the reference timing output signals back to an un-reduced resolution when each identification step is complete.

2. The cell search method according claim 1, wherein the one or more identification steps includes a slot timing identification step.

3. The cell search method according to claim 1, wherein the one or more identification steps includes frame timing and code group identification step.

4. The cell search method according to claim 1, wherein the one or more identification steps includes a scrambling code identification step.

5. A cell search method for use in a mobile communication system, the method comprising the steps of:
   performing plural identification steps for identifying timing and codes of oversampled input signals;
   reducing a resolution of the oversampled input signals includes before performing the plural identification steps,
   wherein the plural identification steps each produce an output in a form of reference timing output signals, the method further comprising the step of converting the reference timing output signals back to an un-reduced resolution when each identification step is complete.

6. The cell search method according to claim 5, wherein the step of reducing resolution of the oversampled input signals includes at least one of sample-combining and down-sampling the oversampled input signals.

7. The cell search method according to claim 5, the method further comprising the steps of:
   in each identification step, correlating the reduced resolution input signal with a code;
   calculating power of the correlated signal;
   accumulating power results;
   storing the accumulated power results; and
   searching for a maximum accumulated power result.

8. The cell search method according to claim 7, wherein the step of reducing resolution of the oversampled input signals includes at least one of sample-combining and down-sampling the oversampled input signals.

9. The cell search method according to claim 7, the method further comprising the step of comparing the maximum accumulated power result with a threshold.

10. The cell search method according to claim 9, the method further comprising the step of converting the reference timing output signal back to an un-reduced resolution when the threshold is exceeded.

11. The cell search method according to claim 10, wherein the step of reducing resolution of the oversampled input signals includes at least one of sample-combining and down-sampling the oversampled input signals.

12. An apparatus for implementing a cell search in a mobile communication system, comprising:
    identification means for identifying timing and codes from plural oversampled input signals;
    resolution reduction means for reducing resolution of the plural oversampled input signals; and
    conversion means for converting reference timing output signals from the identification means back to original resolution of the plural oversampled input signals.

13. The apparatus according to claim 12, wherein the identification means comprises:
    a slot timing identifier;
    a frame timing code and group number identifier, and
    a scrambling code identifier.

14. The apparatus according to claim 13, wherein the resolution reduction means comprises at least one of a sample-combiner and down-sampler for operation with each of the identifiers.

15. The apparatus according to claim 14, wherein the at least one of a sample-combiner and down-sampler is operable at a different sub-sampling rate for each identifier.

16. The apparatus according to claim 13, wherein said resolution reduction means comprises at least one of a sample-combiner and down-sampler.

17. The apparatus according to claim 13, wherein each identifier comprises:
    a matching or correlating unit for despreading the oversampled input signals,
    a code generator;
    a power profile creator; and
    a detector.

18. The apparatus according to claim 17, wherein the matching or correlating unit comprises a matched filter.

19. The apparatus according to claim 17, wherein the matching or correlating unit comprises a bank of correlators.

20. The apparatus according to claims 17, wherein the power profile creator comprises:
    a power calculator for obtaining the power of a correlated signal;
    an accumulator for accumulating current power results and previous result; and
    a memory for storing the accumulated power results.

21. The apparatus according to claim 17, wherein the detector is arranged to search for a maximum value among the accumulated power results.

22. The apparatus according to claim 17, wherein the detector comprises a decision unit for comparing the detected maximum against a threshold.

23. The apparatus according to claim 22, wherein the conversion means is arranged to convert the reference timing output signal back to an un-reduced resolution when the threshold is exceeded.

* * * * *